United States Patent [19]
Anderson

[11] 4,053,084
[45] Oct. 11, 1977

[54] FILLER PLUG

[75] Inventor: Bruce W. Anderson, Rosemont, Ill.

[73] Assignee: Illinois Tool Works Inc., Chicago, Ill.

[21] Appl. No.: 662,868

[22] Filed: Mar. 1, 1976

[51] Int. Cl.² .................... B65D 49/02; F16K 21/04
[52] U.S. Cl. ................................. 220/229; 137/849;
220/268; 220/284; 220/307; 220/DIG. 19
[58] Field of Search .................... 425/817 R; 137/849;
220/266, 268, 306, 307, 287, 229, 284, DIG. 19

[56] References Cited

U.S. PATENT DOCUMENTS

| 2,586,858 | 2/1952 | Parsons | 220/266 |
| 2,822,819 | 2/1958 | Geeraert | 137/849 |
| 3,168,961 | 2/1965 | Yates | 220/307 |
| 3,245,428 | 4/1966 | Klimak et al. | 137/849 |
| 3,262,599 | 7/1966 | Muller | 220/307 |
| 3,370,659 | 2/1968 | Gatien | 137/849 |
| 3,622,034 | 11/1971 | Lutzker et al. | 220/307 |
| 3,739,936 | 6/1973 | Jones, Jr. | 425/817 R |

FOREIGN PATENT DOCUMENTS

| 118,830 | 8/1944 | Australia | 137/849 |

Primary Examiner—George E. Lowrance
Assistant Examiner—Allan N. Shoap
Attorney, Agent, or Firm—Olson, Trexler, Wolters, Bushnell & Fosse, Ltd.

[57] ABSTRACT

A closure plug is disclosed which is especially adapted for use in retaining insulation inside the cavities of refrigerators and like appliances. The plug includes a number of petal-like flaps which are conically arrayed and originally point relatively outwardly. When an insulation nozzle is pushed against the petal flaps, the flaps are forced inwardly, and splay apart to permit nozzle insertion through the plug. After the nozzle is withdrawn, the petal flaps return to form an inverted cone pointing relatively inwardly. Beveled petal flap sides provide planar inter-petal contact and structural conical strength to resist the outward flow of insulation. The plug is fastened to a cavity-defining wall by a base having a polygonal cross-sectional shape substantially coextensive with a polygonal wall aperture, and a head of polygonal cross-sectional shape at least congruent with the wall aperture but angularly offset with respect to and depending from the base to engage the wall and retain the plug on the wall.

18 Claims, 8 Drawing Figures

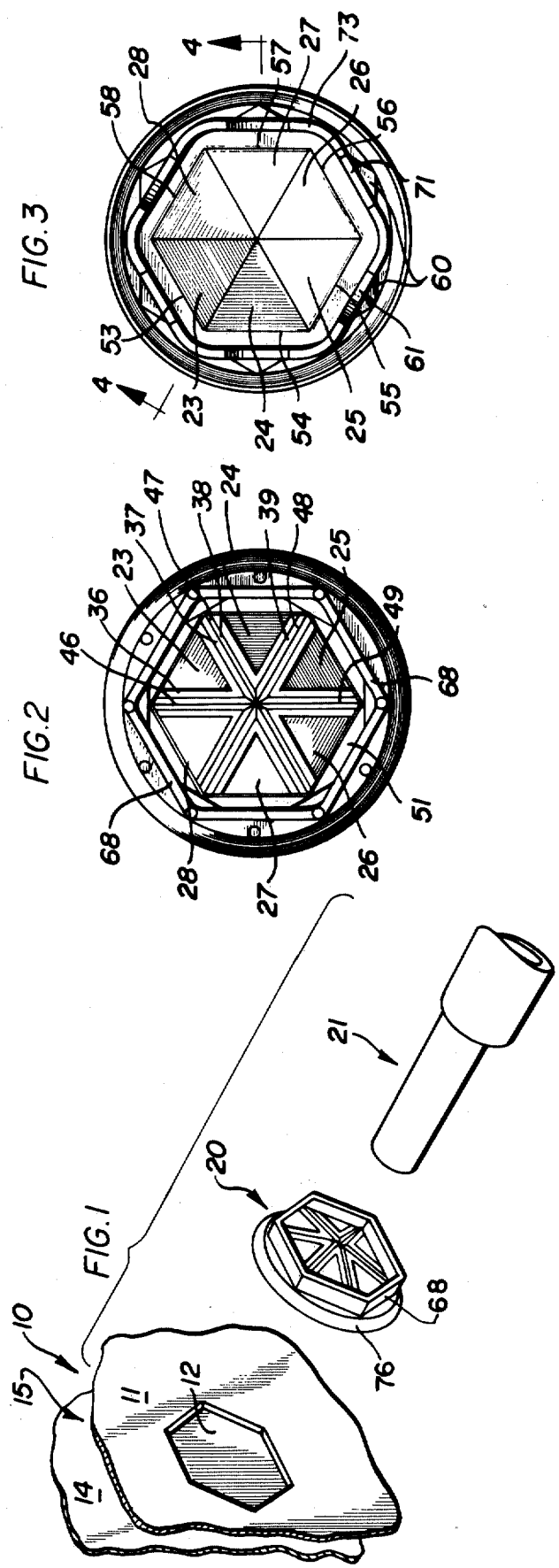
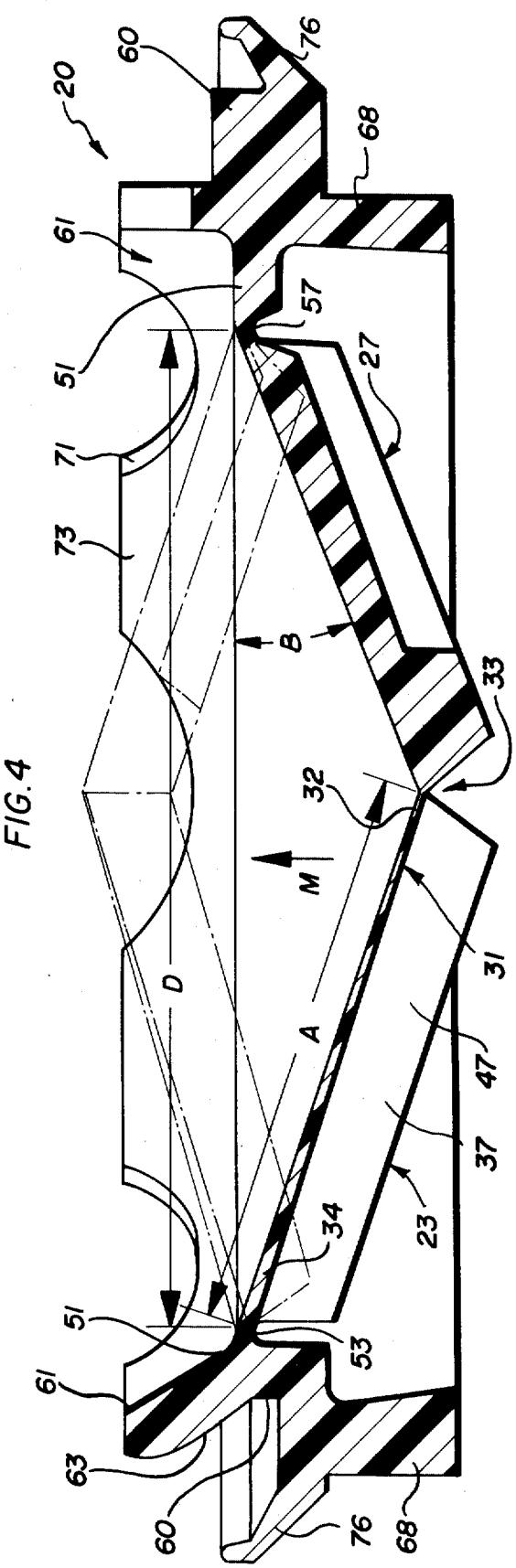

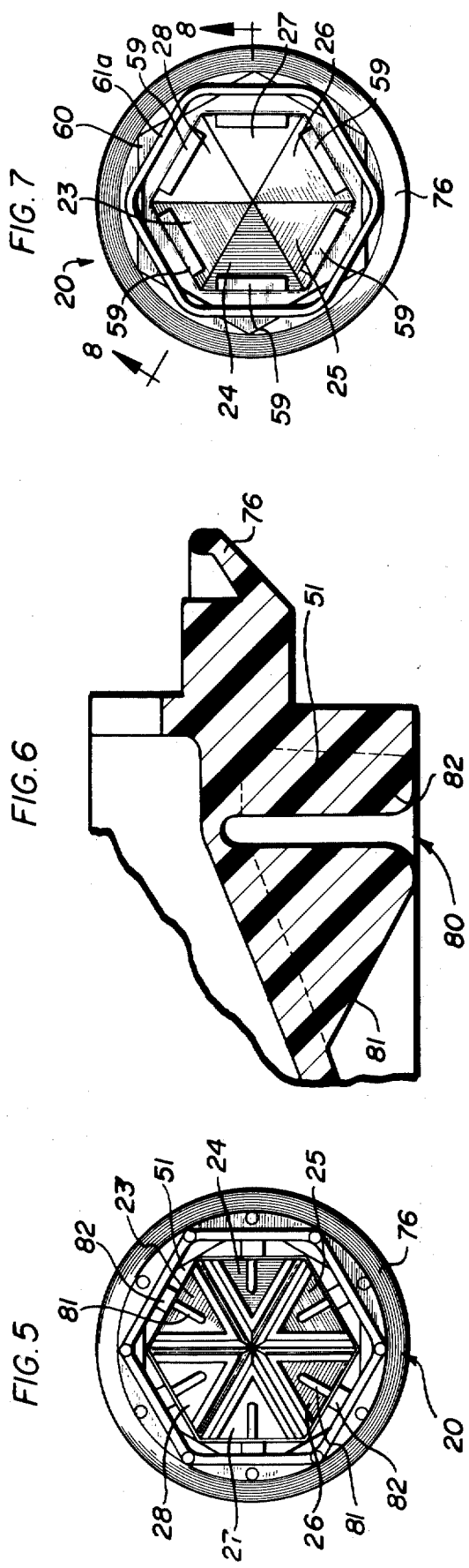
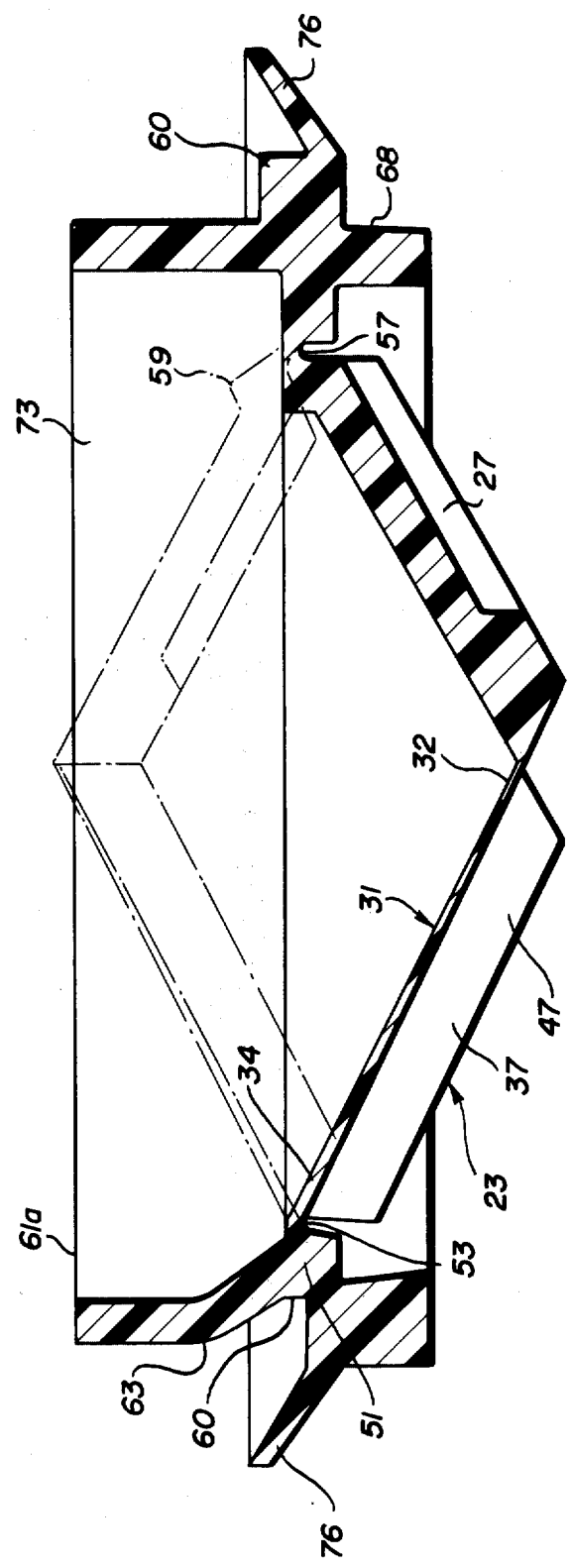

FILLER PLUG

BACKGROUND OF THE INVENTION

This invention relates generally to plug devices, and more particularly concerns a plug especially adapted for use in retaining insulation inside the cavities of refrigerators and like appliances.

In the manufacture of double-walled appliances such as insulated refrigerators and the like, modern practice calls for preliminary assembly of an outer shell and an inner shell to form a hollow cavity. After the cabinet defined by these shells has been assembled, a foaming resin mixture, such as polyurethane foam, is introduced into the cavity between the shells. This is often accomplished by conducting the foaming insulation material along a tube and nozzle through an aperture or hole formed in the outer cabinet shell. To present a neat, finished appearance to the appliance, and to prevent an outflow of insulating material, a plug is emplaced in the shell aperture.

Some plugs offered to accomplish these purposes have been of the prior-placement variety; that is, they have been designed to be installed in an appliance shell wall prior to introduction of insulation into the cavity. These plugs accommodate an insulation-delivering nozzle, and after the conduit has been withdrawn, the plug retains the emplaced material behind the outer cavity wall.

It is the general object of the present invention to provide a cavity closure plug for home appliances and the like which is less expensive yet more effective than those previously offered.

A more specific object of the invention is to provide a filler plug of the type described which can be opened to permit introduction of material behind the plug-associated wall without the user paying particular attention to the plug and its structure. An associated object is to provide such a plug which can be used without requiring the use of special tools or use techniques.

Another object is to provide such a plug which will afford a secure, permanent seal after the plug has been opened and material has been emplaced behind the wall.

Yet another object is to provide such a plug which can be easily installed by even relatively inexperienced personnel using inexpensive, simple tools.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a fragmentary exploded view showing the novel filler plug of the present invention together with a wall to which the plug can be attached and an insulation-delivering nozzle;

FIG. 2 is a front elevational view of one embodiment of the present invention;

FIG. 3 is a rear elevational view of the plug;

FIG. 4 is a sectional view taken substantially in the plane of line 4—4 in FIG. 3;

FIG. 5 is a front elevational view of an alternate embodiment of the novel plug;

FIG. 6 is a fragmentary sectional view showing in further detail the alternate embodiment of the invention;

FIG. 7 is a rear elevational view of the plug illustrated in FIGS. 5 and 6; and

FIG. 8 is a sectional view taken substantially in the plane of line 8—8 in FIG. 7.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown a fragment 10 of a refrigerator or similar device with which the present invention can be used. Here, this fragment 10 includes a wall 11 which defines a polygonal aperture 12. An opposite wall 14 defines a cavity 15 for receiving and retaining insulation material.

The novel filler plug 20 of the present invention is adapted to fit within and be retained in and upon the wall aperture 12. In accordance with the invention, this polyethylene resin plug 20 permits insertion of an insulation conduit nozzle 21 into and through the plug, through the wall aperture 12, and into the cavity 15 formed between the double walls 11 and 14. The plug 20 also securely retains emplaced insulation material in the cavity 15 after the nozzle 21 has been withdrawn from the plug 20. To this end, the plug 20 includes a plurality of petal flaps — here, six flaps 23–28 inclusive are used. As shown particularly in FIGS. 2–4, these petal flaps 23–28 are conically arrayed and originally the cone array points outwardly as shown in FIG. 1. This structural arrangement is created by forming the triangular petal flaps 23–28 with altitudes A larger than one-half the distance D of the plug opening. In the illustrated embodiment, the cone has a base angle B of approximately 30°; to form this, the opening distance D can be considered to be of a magnitude such as two units of measure, and the flap triangular altitude A has a magnitude of $\sqrt{3}$ units of measure. When so formed, these relative sizes permit easy plug opening action and nozzle insertion, while still providing a solid, insulation-blocking, inwardly directed cone after plug use.

When the nozzle 21 is forced into engagement with the petal flaps 23–28, the flaps are first compressed and then pressed inwardly in the direction of the arrow M in FIG. 4. As this flap inward motion occurs, a web 31 which interconnects each petal 23–28 with the adjacent petals is torn, thereby freeing the petal flaps 23–28 for inward motion. As can be envisioned, when the nozzle 21 is fully inserted into the plug, the petal flaps 23–28 are splayed inwardly to accommodate the nozzle and permit easy insulation depositing action within the cavity 15.

It is a feature of the invention that this web tearing occurs progressively and in a controlled manner, so as to discourage inadvertent damage to the plug 20 itself. To this end, the web 31 is tapered in its thickness from a relatively thin membrane 32 near the conical point 33 to a relatively thick membrane near the base 34 of each petal.

As the nozzle 21 is withdrawn, the petal flaps 23–28 return from their splayed position to a relatively interengaged, plug-closed position shown in dotted lines in FIG. 4. However, since the flap altitudes A are of the size described above, the petal flaps 23–28 now form an inverted cone pointed relatively inwardly, wherein they abuttively support one another and inhibit outward flow of insulating material through the closure plug.

It is a feature of the invention that the inwardly directed cone is relatively solid, and resists a relatively large amount of insulation-escape force applied to the petal flaps 23-28. To this end, each petal includes a peripheral rib 36-39 as shown in FIG. 2 along those flap edges 46-49 which are located adjacent other petal flap edges. Together, the petals 23-28 themselves and the petal ribs 36-39 provide petal edges 46-49 of extended thickness to bear against one another and to provide solid inter-petal support and conical structural solidity.

In further accordance with this aspect of the invention, these petal sides 46-49 are beveled at an angle permitting each beveled petal edge 46-49 to contact an adjacent beveled petal edge in abutting planar engagement, when the petals are together located in their inverted cone, inwardly-pointing array, thereby providing yet additional inter-petal flap support. Again, in the illustrated embodiment where the opening distance D is two units of measure and the altitude A of a petal flap is $\sqrt{3}$ units of measure, this bevel angle is substantially 30° to the perpendicular of the planar flap back, to provide the desired full planar contact along the interengaging petal flap sides.

The petal flaps 23-28 are hinged to a plug platform 51 by webs 53-58, respectively. To prevent inadvertent damage to the hinges, the webs 53-58 are formed so as to be somewhat thicker than the frangible web 31 which originally interconnects the petal flaps 23-28. Reinforcing webs 59 can be provided if desired, as shown in the embodiment illustrated in FIGS. 5-8.

In accordance with another aspect of the invention, this filler plug 20 is quickly and easily attached to the wall 11 by even inexperienced personnel using elemental, low cost, simple tools. To this end, the plug includes a base 60 of a polygonal cross-sectional shape substantially coextensive with the polygonal shape of the wall aperture 12. To this base 60, a head 61 is formed; this head 61, too, has a polygonal cross-sectional shape at least congruent with the aperture hole 12, but is angularly offset with respect to and projects or depends from the base 60 as shown in FIG. 4. Cam surfaces 63 extend from the base 60 and taper into the head 61 to engage the wall 11 and retain the plug 20 in and on the aperture 12. In the illustrated embodiment, this head 61 and base 60 both take the form of equal-sided hexagons, and the head 61 is angularly offset with respect to the base 60 at an angle of substantially 30°. It will be understood, however, that the aperture 12 can be of any regular polygonal configuration having N sides. To completely cover the aperture 12, the head 60 and the base 61 also take the form of regular polygons having a shape and size substantially equal to the shape and size of the aperture 12, and thus also have N sides.

To permit the plug 20 to be inserted into the aperture 12 and to be twisted into its final, locked-in position, a wrench-accommodating wall 68 is provided on the plug. Here, this wall 68 takes the form of a regularly shaped hexagon.

In the embodiment shown in FIGS. 2-4, scallops 71 are provided in the head 61 to permit the head corners 73 to be temporarily resiliently collapsed as the plug 20 is wrenched into its final position within and upon the aperture 12. No such scallops are included in the head embodiment 61a shown in FIGS. 5-8.

Plug installation is easy, even for inexperienced workers. First, the plug 20 is oriented as generally illustrated in FIG. 1. The plug is then moved toward the wall 11 so as to push the plug head 61 or 61a into and through the aperture 12. When the plug is so preliminarily installed, the worker then rotates the plug 20 through about 1/12 of a revolution, or 30°, in either direction by using a wrench or other suitable tool if necessary. This rotational motion aligns the base 60 with the aperture 12 and causes the base to be snapped into the hole by the cam surface shoulders 63.

To provide a positive plug-wall seal, a flared skirt 76 can be formed at the plug periphery which is adapted to engage the outer surfaces of the wall 11. Plug installation in and on the wall causes the skirt 76 to splay radially outwardly, thereby enhancing the skirt-wall engagement and seal. This skirt 76 also acts as a Bellville washer-type spring, and urges the fastener head 60 to be retained within the aperture 12 and the head 61 to engage the inner side of the wall 11.

If desired, a safety abutment mechanism can be included in the plug 20 to prevent the petals 23-28 from springing fully opened outwardly past a predetermined position, in the event an outward flow of material forces the petal flaps 23-28 from their inverted-cone, inwardly-pointed position back to and through or past their original outwardly-pointed position. This safety abutment mechanism 80, as shown in FIGS. 5 and 6, includes abutment stops 81 and 82 which are located upon the plug platform 51 and upon the adjacent petal flaps 23-28. Outward opening action of the petal flaps 23-28 brings these stops 81 and 82 into abuttive engagement and prohibits further outward motion of the petal flaps, as can be envisioned from FIG. 6.

The invention is claimed as follows:

1. A one-piece plastic closure plug for use with an aperture formed in a wall, the plug including a plurality of petal flaps conically arrayed with hinged connections to said plug, and said flaps including structure so that they are originally pointing outwardly in one direction away from the plane of said wall, each petal including a peripheral rib formed along those petal flap edges located adjacent other petal flap edges to provide petal flap edges of extended thickness, said edges of extended thickness being bevelled to provide a predetermined included angle between said adjacent edges, said petal flaps further including means arranged and shaped to form an inverted cone pointing inwardly in a direction opposite to said one direction and toward the opposite side of the plane of said wall after plug use with said adjacent bevelled extended thickness flap edges being in intimate, substantially planar contact to abuttingly support one another and inhibit outward flow of material through the closure plug, and fastener means for mounting the plug in and on the wall aperture.

2. A closure plug according to claim 1 wherein said petal flaps are triangular in general shape.

3. A closure plug according to claim 2 wherein said petal flaps are six in number.

4. A closure plug according to claim 3 wherein said petal flaps take the general shape of equilateral triangles.

5. A closure plug according to claim 2 wherein the altitude of each triangular petal flap is larger than one half the distance across said plug opening, to provide a conical petal flap array.

6. A closure plug according to claim 5 wherein the ratio of petal flap altitude to plug opening distance is substantially $\sqrt{3}:2$.

7. A closure plug according to claim 1 including a frangible web originally interconnecting each petal to the adjacent petal flaps, but being torn by insertion of a nozzle device during plug use.

8. A closure plug according to claim 7 wherein said frangible web is tapered in its thickness from a relatively thin web at the tip of the petal flap cone to a relatively thick section at the petal flap cone base, whereby to encourage controlled, progressive web tearing during nozzle insertion.

9. A closure plug according to claim 1 wherein said bevel angle is substantially 30° to the perpendicular, as measured from the planar flap back.

10. A closure plug according to claim 1 including a flared skirt extending from the plug for engaging the outerwall surface and providing a plug-wall seal.

11. A closure plug according to claim 1 for attachment to a wall having a polygonal aperture of predetermined shape and wherein said fastener means includes an axially extending base having a polygonal shape substantially complimentary in cross section with the polygonal aperture shape, and a head of polygonal shape at least congruent with the wall aperture but angularly offset with respect to and depending from the base, and cam surfaces extending from the head to the base to engage and retain the plug on the wall with the fastener means and base substantially filling the periphery of the wall aperture.

12. A plug according to claim 11 wherein said head is angularly offset with respect to said base at an angle of substantially 30°, the plug being lockable to said wall at a predetermined angular orientation when the fastener head is pushed into and through the wall aperture and the plug is rotated through substantially one twelfth of a revolution to resiliently cam the fastener base into the wall aperture.

13. A plug according to claim 11 wherein said fastener base is a regular polygon having N sides of equal length, and said head is a regular polygon having N sides of equal length.

14. A plug according to claim 11 including wrench-accommodating wall means to permit the plug to be rotated into its final assembled position on said wall.

15. A plug according to claim 14 wherein said wrench accommodating wall takes the form of a regular hexagon.

16. A plug according to claim 11 including a flared skirt for engaging the wall and resiliently urging said fastener base into the wall aperture, and said fastener head into a retaining position against an opposite wall side.

17. A closure plug according to claim 1 including stop means carried on said petal flaps and on other portions of the plug to prevent said petal flaps from opening outwardly past a predetermined position in the event an outward flow of material forces the petal flaps from their inverted-cone, inwardly-pointed position back toward their original outwardly-pointed-cone configuration.

18. A closure plug according to claim 17 wherein said stop means includes at least one stop abutment formed upon each plug petal flap and the corresponding stop abutment positioned upon the plug to engage the petal flap abutment.

* * * * *